(12) United States Patent
Ninagawa

(10) Patent No.: US 10,787,100 B2
(45) Date of Patent: Sep. 29, 2020

(54) VEHICLE SEAT

(71) Applicant: TOYOTA BOSHOKU KABUSHIKI KAISHA, Aichi (JP)

(72) Inventor: Atsushi Ninagawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 31 days.

(21) Appl. No.: 16/042,152

(22) Filed: Jul. 23, 2018

(65) Prior Publication Data

US 2019/0023156 A1 Jan. 24, 2019

(30) Foreign Application Priority Data

Jul. 24, 2017 (JP) ................................ 2017-143004

(51) Int. Cl.
| | |
|---|---|
| *B60N 2/06* | (2006.01) |
| *B60N 2/30* | (2006.01) |
| *B60N 2/68* | (2006.01) |
| *B60N 2/20* | (2006.01) |
| *B60N 2/70* | (2006.01) |

(52) U.S. Cl.
CPC .................. *B60N 2/06* (2013.01); *B60N 2/20* (2013.01); *B60N 2/3002* (2013.01); *B60N 2/68* (2013.01); *B60N 2/682* (2013.01); *B60N 2/70* (2013.01)

(58) Field of Classification Search
CPC .......... B60N 2/06; B60N 2/20; B60N 2/3002; B60N 2/68; B60N 2/682; B60N 2/686; B60N 2/70; B60N 2/1615; B60N 2/161

USPC ........................................................ 248/429
See application file for complete search history.

(56) References Cited

U.S. PATENT DOCUMENTS

| 9,694,716 | B2* | 7/2017 | Masuda | .................... B60N 2/62 |
|---|---|---|---|---|
| 2015/0091338 | A1* | 4/2015 | Hayashi | .................... B60N 2/72 |
| | | | | 297/180.1 |
| 2015/0336477 | A1* | 11/2015 | Matsui | .................... B60N 2/06 |
| | | | | 297/344.15 |
| 2019/0023156 | A1* | 1/2019 | Ninagawa | ............. B60N 2/3002 |
| 2019/0118686 | A1* | 4/2019 | Ninagawa | ............... B60N 2/682 |

FOREIGN PATENT DOCUMENTS

JP 2016-049796 4/2016

OTHER PUBLICATIONS

US 10,442,318 B2, 10/2019, Shinozaki (withdrawn)*

* cited by examiner

*Primary Examiner* — Christopher Garft
(74) *Attorney, Agent, or Firm* — Greenblum & Bernstein, P.L.C.

(57) ABSTRACT

A vehicle seat is provided. The vehicle seat includes a side frame, a tilt arm, a cushion panel, a receiving surface, and a pad support. The tilt arm extends from a coupling portion coupled to the side frame to a seat front side. The cushion panel is coupled to a front end portion of the tilt arm and support a front end portion of the cushion pad. The receiving surface supports the cushion pad from below. The pad support has a flange that extends downward from both ends in a seat-width axis of the receiving surface. The receiving surface is a substantially strip-shaped continuous surface. The flange is continuous within a range in which the receiving surface is provided.

5 Claims, 8 Drawing Sheets

VEHICLE SEAT

CROSS-REFERENCE TO RELATED APPLICATIONS

This application claims the benefit of Japanese Patent Application No. 2017-143004 filed on Jul. 24, 2017 with the Japan Patent Office, the entire disclosure of which is incorporated herein by reference.

BACKGROUND

The present disclosure relates to a vehicle seat to be mounted on a vehicle.

For example, a vehicle seat disclosed in Japanese Unexamined Patent Application Publication No. 2016-049796 (Patent Document 1) includes a tilt mechanism. The tilt mechanism makes it possible to change a tilt angle of a front end of a seat cushion.

The tilt mechanism disclosed in Patent Document 1 has two tilt arms and a cushion panel (also known as a "front panel"). Each of the two tilt arms is pivotably coupled to a cushion frame. The cushion panel couples front ends in an extending direction of the two tilt arms, and extends in a seat-width axis to support the front end of the seat cushion.

SUMMARY

A seat front end of a cushion pad, which relieves a load applied to the vehicle seat by an occupant, is supported by the cushion panel and the two tilt arms. In this case, especially when the occupant gets off the vehicle, a large load may be applied to one of the two tilt arms on a vehicle entrance/exit side.

In other words, the occupant, when getting off the vehicle, may slide the buttocks and the legs on the seat cushion. In this case, a large load can be applied to the tilt arm on the vehicle entrance/exit side.

When a large load is applied to the tilt arm, the tilt arm may bite into the cushion pad, and early damage of the cushion pad may be caused. The present disclosure discloses an example of a vehicle seat that can inhibit early damage of a cushion pad.

The vehicle seat includes a side frame, a tilt arm, and a cushion panel. The side frame is arranged on one end in a width axis of the vehicle seat and extends in a seat front-rear direction. The tilt arm has a coupling portion coupled to the side frame and extends from the coupling portion to a seat front side. The cushion panel is coupled to a front end portion of the tilt arm to extend in the seat-width axis. The cushion panel supports a front end portion of a cushion pad. The side frame configures a part of a cushion frame of the vehicle seat.

A pad support provided on the tilt arm has a receiving surface that supports the cushion pad from below. The pad support may be provided within a support range of the tilt arm which is a range from the coupling portion to the cushion panel.

The receiving surface is a substantially strip-like continuous surface. The receiving surface may be continuous within the support range. This makes it possible to increase the area of the receiving surface. Therefore, the tilt arm can be inhibited from biting into the cushion pad, and can also decrease a load (a pressure upon getting on or off a vehicle) applied to the buttocks and the legs (especially, the thighs) of an occupant.

A flange extends downward from both ends in the seat-width axis of the receiving surface. The flange is continuous within a range in which the receiving surface is provided. The flange may be integrally formed with the receiving surface.

This makes it possible to inhibit an edge portion, such as a cut end surface, from being present at a contact part between the cushion pad and the tilt arm. Further, early damage of the cushion pad can be inhibited.

The vehicle seat may be configured as follows.

It is desirable that an outer edge on one end side in the seat-width axis of a support front end projected on an imagined plane substantially coincides with an outer edge on one end side in the seat-width axis of a panel rear end projected on the imagined plane. This makes it possible to inhibit the occupant from experiencing a large sense of discomfort, when the occupant slides the buttocks and the legs on the seat cushion to get off the vehicle.

The support front end is an end portion of the pad support on the cushion panel side. The panel rear end is an end portion of the cushion panel on the pad support side. The imagined plane is a hypothetical plane orthogonal to an extending direction of the tilt arm.

If a shield is provided that covers a region of the side frame on a seat rear side of the coupling portion from above, then it is desirable that the following requirements (1) to (3) are satisfied.

(1) The outer edge on one end side in the seat-width axis of the support rear end projected on the imagined plane is located outside the outer edge on one end side in the seat-width axis of a shield front end projected on the imagined plane.

(2) The support rear end is located inside the outer edge on one end side in the seat-width axis.

(3) The support rear end side is a tilted surface smoothly continuing from the outer edge on one end side in the seat-width axis to the support rear end.

This makes it possible to inhibit early damage of the cushion pad at the support rear end and the shield front end.

The support rear end is an end portion of the pad support on the shield side. The shield front end is an end portion of the shield on the pad support side.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

An "embodiment" described below shows an example embodiment within the technical scope of the present disclosure. In other word, matters that specify the invention recited in the claims are not limited to the specific configuration, structure, etc. defined in the embodiment below.

Arrows and the like indicating directions attached to respective figures are provided to make it easy to understand the relationship between the respective figures. The present disclosure is not limited to the directions attached to the respective figures.

The "occupant" in the present application refers to a vehicle occupant or a user of a vehicle seat.

1. Outline of Vehicle Seat

Figure 1:
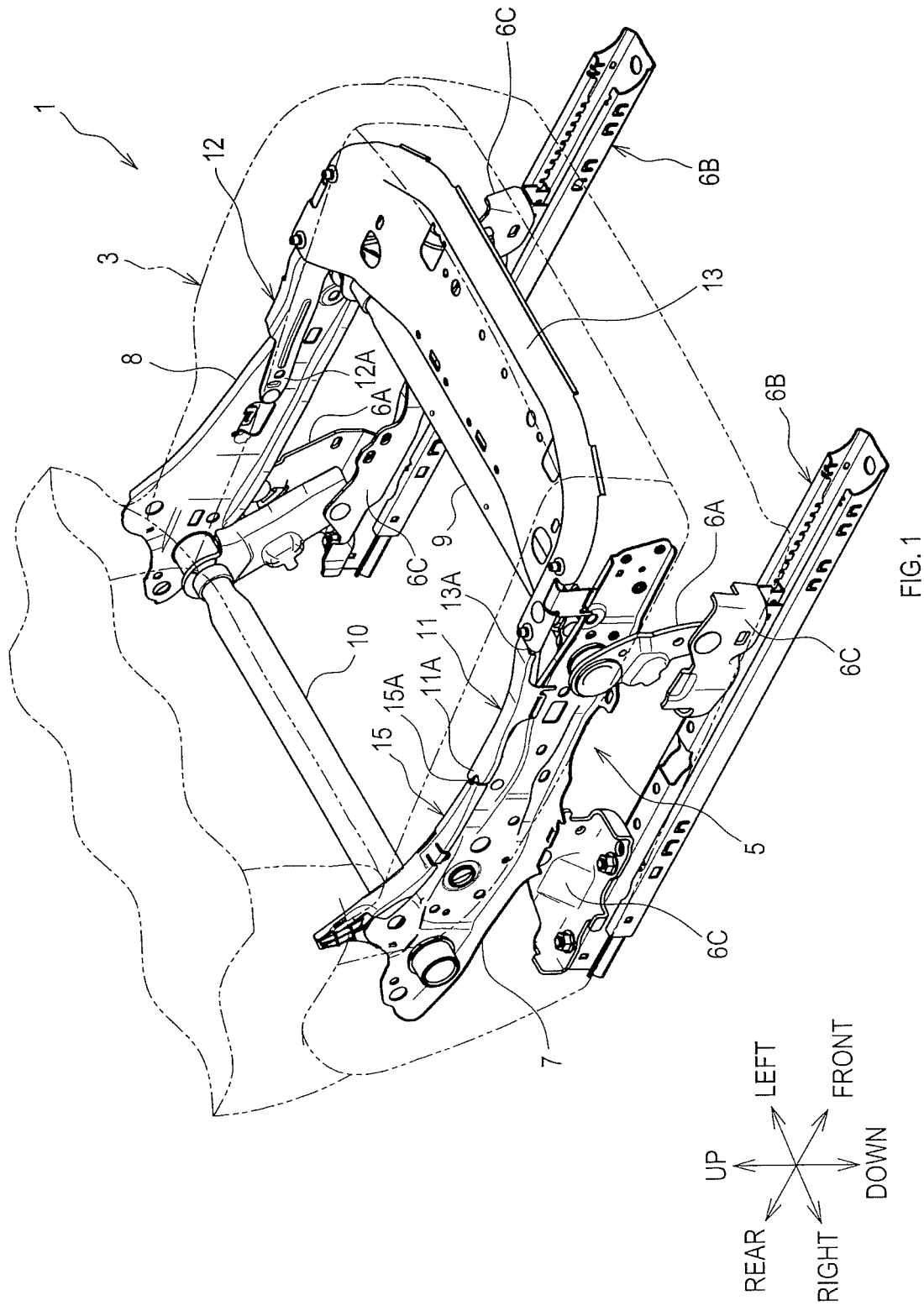
FIG. 1 is a view showing a seat cushion according to an embodiment.

FIG. 1 describes an example of a vehicle seat 1 for a front right seat. A vehicle entrance/exit exists (not shown) on a right end side in a seat-width axis.

The vehicle seat 1 has a seat cushion 3 and a seatback (not shown). The seat cushion 3 supports the buttocks of an occupant. The seatback supports the back of the occupant.

2. Structure of Seat Cushion 2.1 Outline

Figure 2:
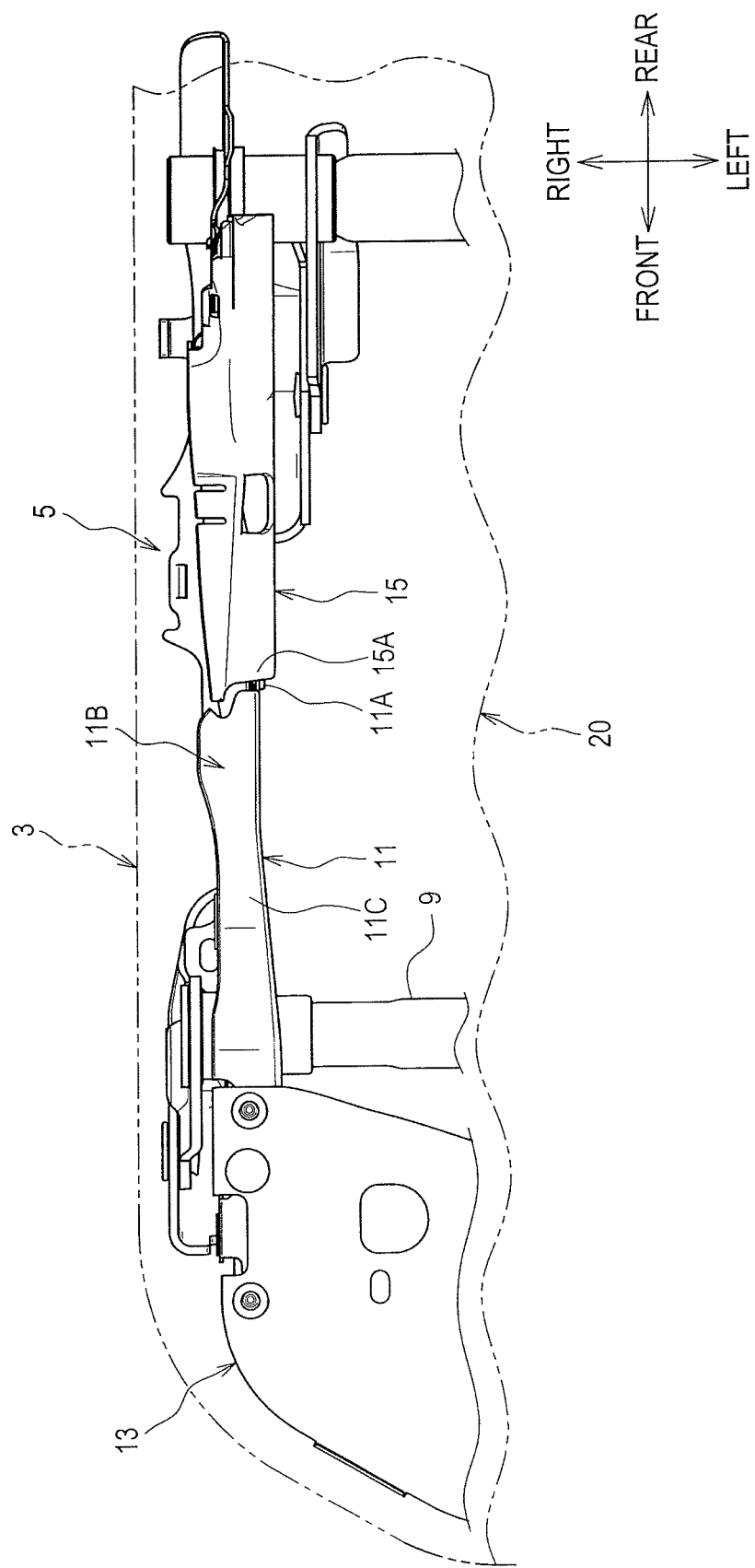
FIG. 2 is a view showing a part of the seat cushion according to the embodiment.

FIG. 2 shows the seat cushion 3 including a cushion frame 5 and a cushion pad 20. The cushion frame 5 configures a frame of the seat cushion 3. The cushion pad 20 is a cushioning material supported by the cushion frame 5. The cushion pad 20 according to the present embodiment is made of a foamed elastic body such as urethane.

Returning to FIG. 1, the cushion frame 5 is fixed to a floor panel or the like of a vehicle via a plurality of lifter links 6A and two slide devices 6B. The plurality of lifter links 6A are link materials for raising and lowering the cushion frame 5, that is, the vehicle seat 1. An upper end of each lifter link 6A is pivotably coupled to the cushion frame 5.

A lower end of each lifter link 6A is pivotably coupled to each slide device 6B via an intermediate bracket 6C provided corresponding to each lifter link 6A. Each slide device 6B fixes the vehicle seat 1 to the vehicle in a slidable manner.

2.2 Structure of Cushion Frame

The cushion frame 5, as shown in FIG. 1, includes a right side frame 7, a left side frame 8, a front coupling rod 9, and a rear coupling rod 10. The right side frame 7 and the left side frame 8 each configure a part of the cushion frame 5.

The right side frame 7 is arranged on one end side in the seat-width axis (right end side, in the present embodiment) and extends in a seat front-rear direction. The left side frame 8 is arranged on the other end side in the seat-width axis (left end side, in the present embodiment) and extends in the seat front-rear direction.

The front coupling rod 9 and the rear coupling rod 10 extend in the seat-width axis and couples the right side frame 7 and the left side frame 8. The front coupling rod 9 couples a front end of the right side frame 7 and a front end of the left side frame 8 together. The rear coupling rod 10 couples a rear end of the right side frame 7 and a rear end of the left side frame 8 together.

A right tilt arm 11 is pivotably coupled to the right side frame 7. A left tilt arm 12 is pivotably coupled to the left side frame 8. The right tilt arm 11 has a coupling portion 11A (see FIGS. 1-3) and extends from the coupling portion 11A to a seat front side. The coupling portion 11A pivotably couples the right tilt arm 11 to the right side frame 7.

The left tilt arm 12 has a coupling portion 12A (see FIG. 1) pivotably coupled to the left side frame 8 and extends from the coupling portion 12A to the seat front side. Front ends of the right tilt arm 11 and the left tilt arm 12 are coupled and fixed to the cushion panel 13.

The cushion panel 13 is a substantially horizontal plate-like panel which extends in the seat-width axis. The cushion panel 13 supports a front end of the cushion pad 20. The right tilt arm 11 and left tilt arm 12 are approximately symmetrical to each other.

2.3 Structure of Tilt Arm

Hereinafter, details of a tilt arm will be described with the right tilt arm 11 located on the right end side in the seat-width axis, that is, on the entrance/exit side.

Figure 3:
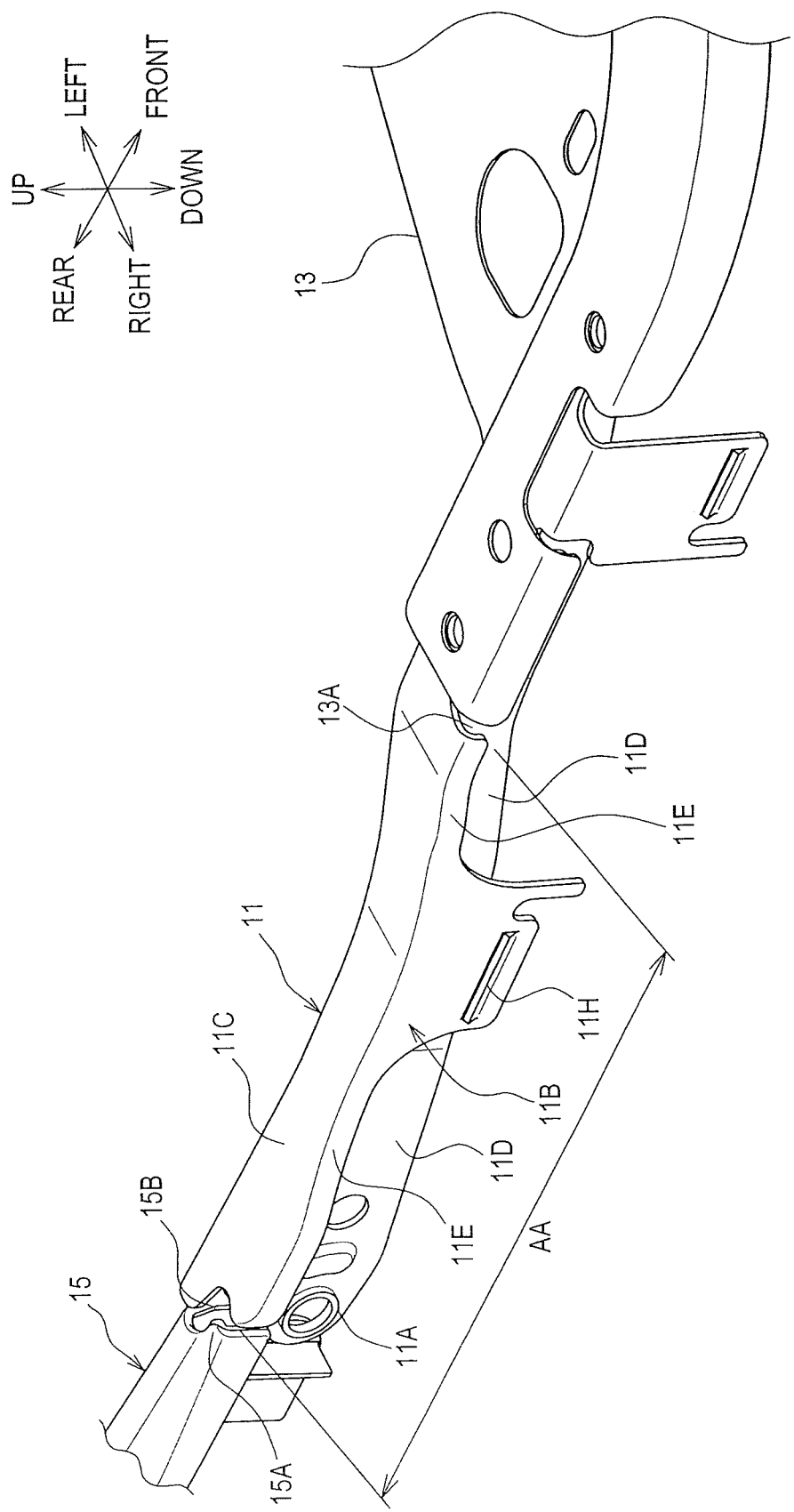
FIG. 3 is a view showing a tilt arm, a cushion panel, and a shield according to the embodiment.

A pad support 11B is provided within a support range AA of the right tilt arm 11, as shown in FIG. 3. The support range AA is a range of the right tilt arm 11 extending from the coupling portion 11A to the cushion panel 13.

Figure 4:
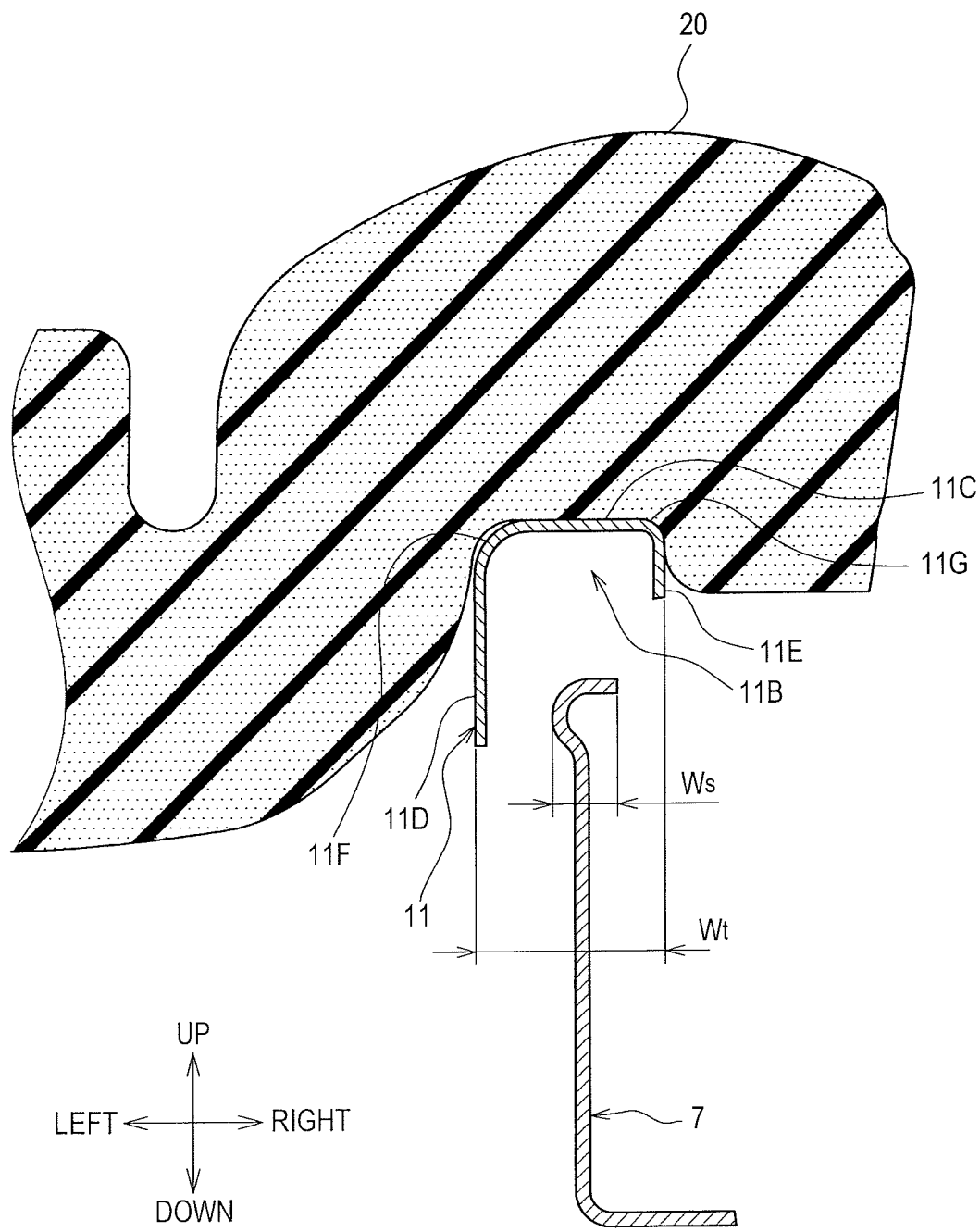
FIG. 4 is a view showing a cushion pad, the tilt arm, and a side frame according to the embodiment.

The pad support 11B, as shown in FIG. 4, supports the cushion pad 20. The pad support 11B has a receiving surface 11C, a first flange 11D, and a second flange 11E. The receiving surface 11C supports the cushion pad 20 from below.

The receiving surface 11C, as shown in FIG. 3, is configured by a substantially strip-like continuous surface without seams in the support range A. In the present embodiment, a front part of the receiving surface 11C is higher than a rear part of the receiving surface 11C. Also, at least part of receiving surface 11C is tilted.

A width dimension Wt of the receiving surface 11C, as shown in FIG. 4, is equal to or greater than a width dimension Ws of the side frame 7. The first flange 11D is a wall-shaped portion that extends downward from one end (left end, or interior end in the present embodiment) in a width axis of the receiving surface 11C.

The second flange 11E is a wall-shaped portion that extends downward from the other end (right end, or exterior end in the present embodiment) in the width axis of the receiving surface 11C. A downward protruding dimension of the second flange 11E according to the present embodiment is smaller than a downward protruding dimension of the first flange 11D, in order to avoid interference with the surrounding portions (see FIG. 4).

The first flange 11D and the second flange 11E, as shown in FIG. 3, are configured by continuous walls without seams in the support range A in which the receiving surface 11C is provided. The first flange 11D and the second flange 11E are integrally formed with the receiving surface 11C.

In particular, the pad support 11B is a member preferably integrally formed by pressing a metal plate such as SPCC or SPHC. In other words, the receiving surface 11C, the first flange 11D, and the second flange 11E are integrally formed by press working.

A first interface 11F between the receiving surface 11C and the first flange 11D, and a second interface 11G between the receiving surface 11C and the second flange 11E, as shown in FIG. 4, are configured by smooth curved surfaces. The curved surfaces are formed by bending of a plate material in press working.

A hook 11H is provided in the second flange 11E, as shown in FIG. 3. The hook 11H is a portion for catching and locking a skin (not shown) of the seat cushion 3. The skin is a member that covers a surface of the cushion pad 20.

2.4 Interface Structure Between Tilt Arm and Cushion Panel or the Like

Figure 5:
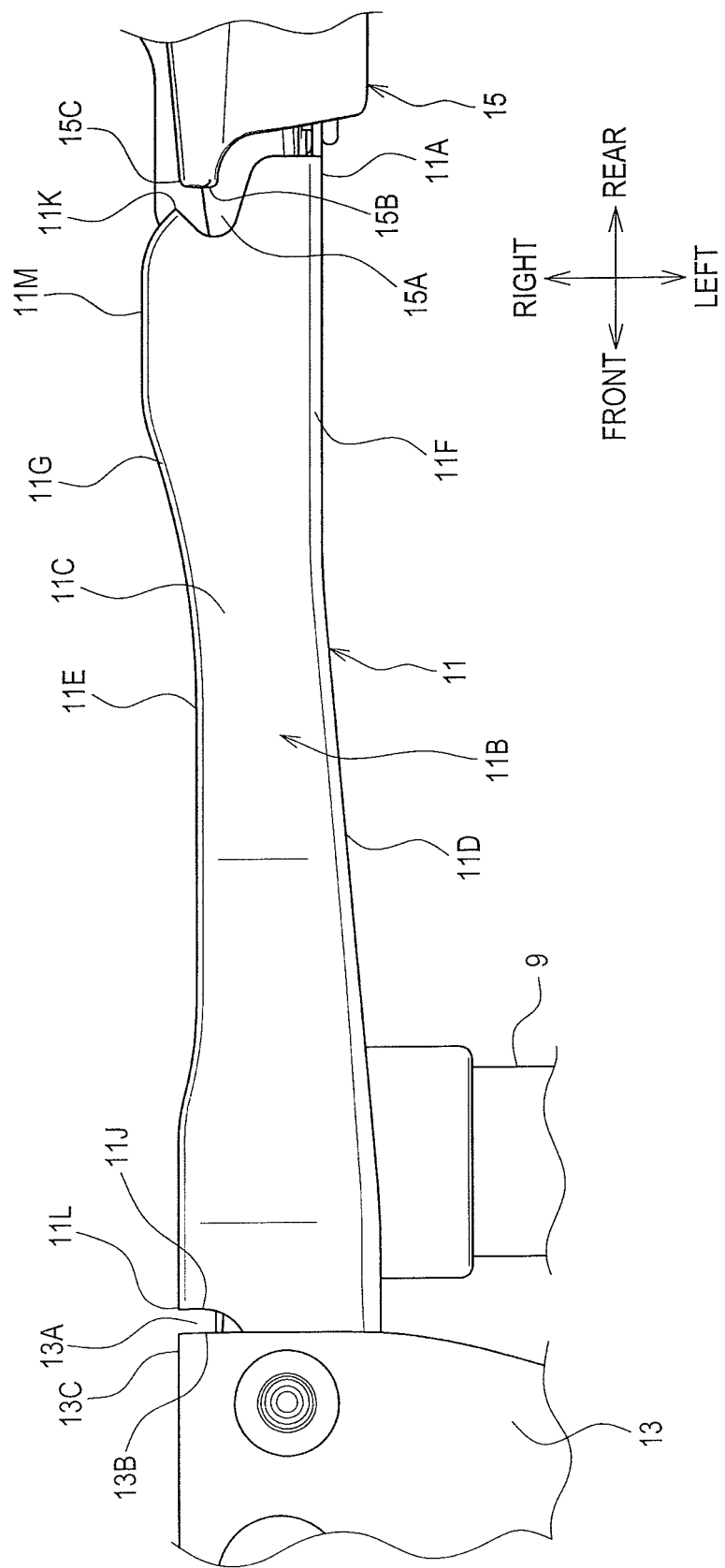
FIG. 5 is a view showing the tilt arm, the cushion panel, and the shield according to the embodiment.

A first gap 13A is provided between the pad support 11B and the cushion panel 13, as shown in FIG. 5. As shown in FIG. 1, a shield 15 is provided on a seat rear side of the right tilt arm 11. Additionally, the first gap 13A separates a front edge of the second flange 11E from a rear edge of a vertical flange of cushion panel 13. This first gap 13A prevents these two flanges from colliding.

Figure 6:
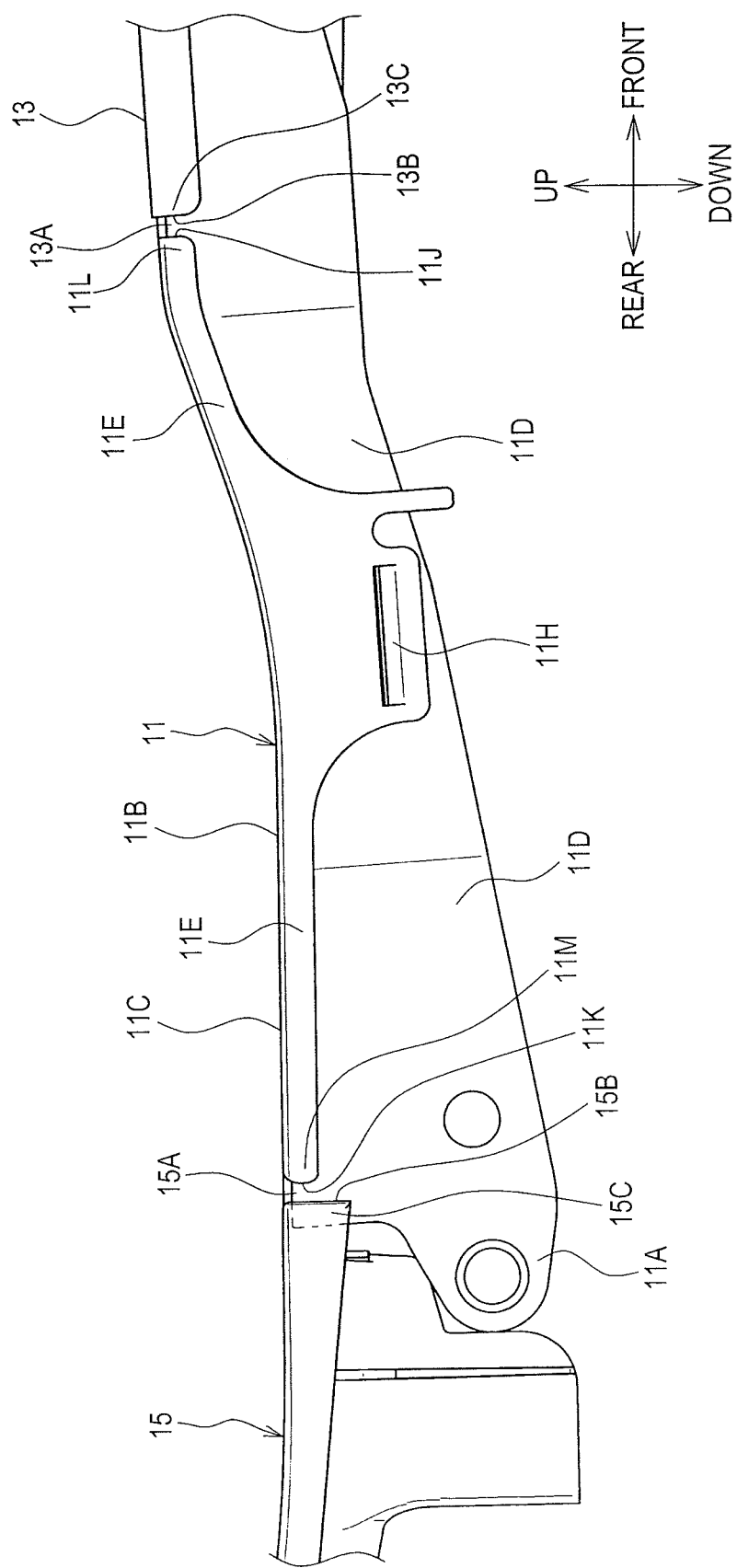
FIG. 6 is a view showing the tilt arm, the cushion panel, and the shield according to the embodiment.

The shield 15 covers a region of the side frame 11 on the seat rear side of the coupling portion 11A from above. As shown in FIG. 6, a second gap 15A is provided between the pad support 11B and the shield 15.

<Structure of First Gap>

FIG. 5 and FIG. 3 show an outer edge 11L (on one end side in the seat-width axis of a support front end 11J) and an outer edge 13C (on one end side in the seat-width axis of a panel rear end 13B) are positioned on substantially a same vertical plane, and are separated by first gap 13A.

The support front end 11J is an end portion of the pad support 11B on the cushion panel 13 side. The panel rear end 13B is an end portion of the cushion panel 13 on the pad support 11B side.

Figure 7:
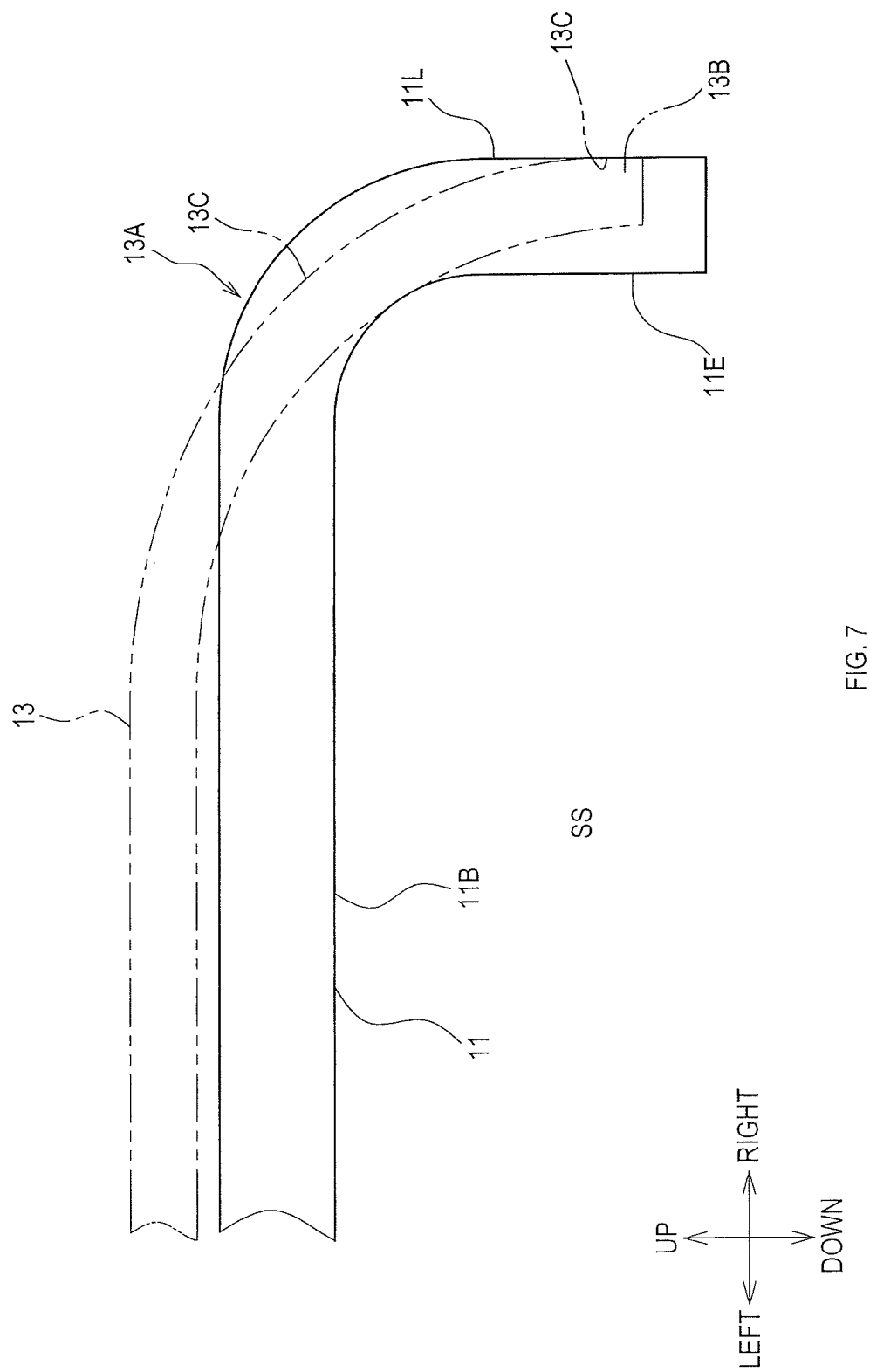
FIG. 7 is a view showing a structure of a first gap according to the embodiment.

The relationship described above, as shown in FIG. 7, indicates that "the outer edge 11L on one end side in the seat-width axis of the support front end 11J projected on an imagined plane (hereinafter, imagined plane SS) orthogonal to a extending direction of the right tilt arm 11" substantially coincides with "the outer edge 13C on one end side in the seat-width axis of the panel rear end 13B projected on the imagined plane SS". The imagined plane SS is a plane parallel to a paper plane of FIG. 7.

<Structure of Second Gap>

Figure 8:
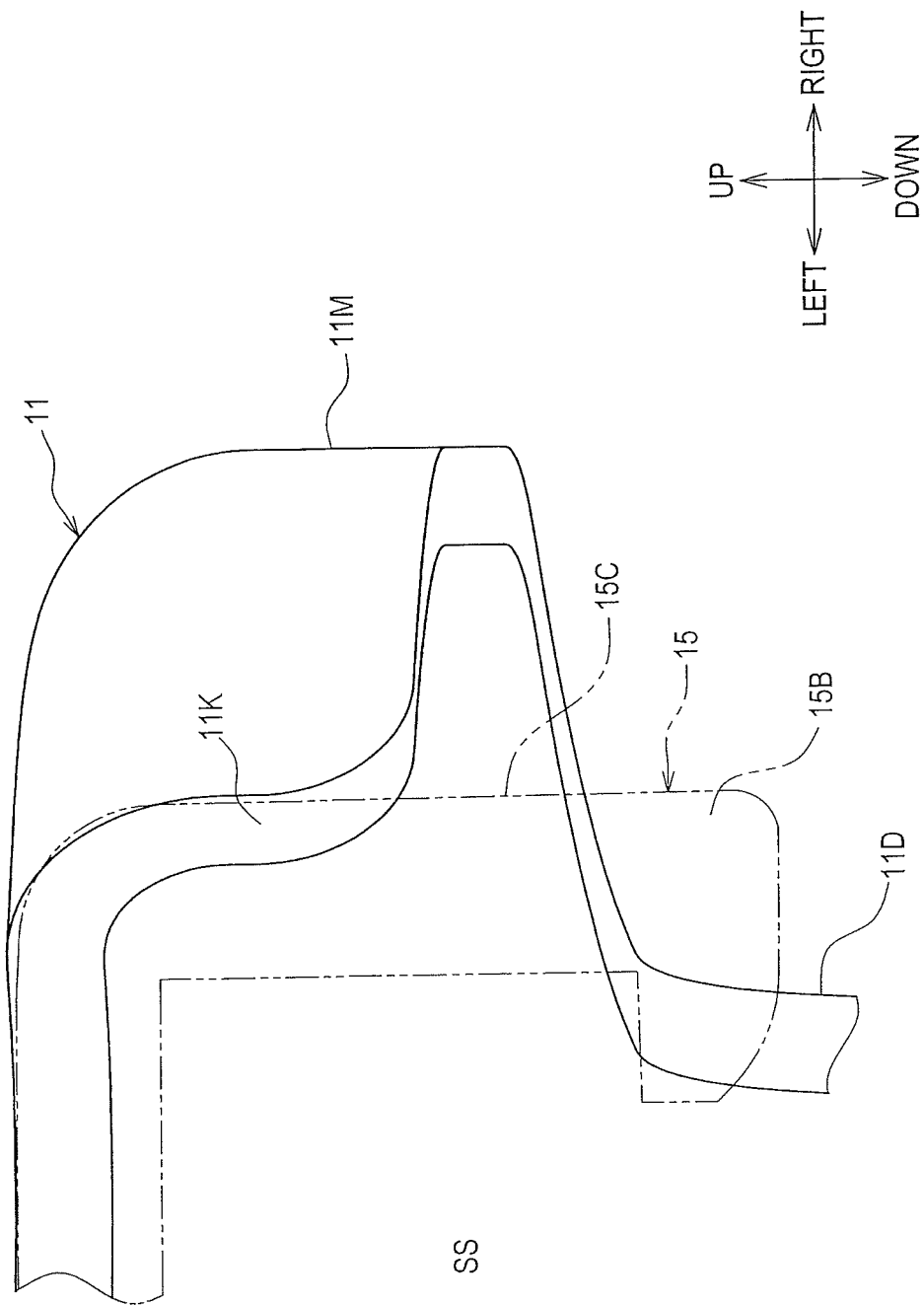
FIG. 8 is a view showing structure of a second gap according to the embodiment.

In the present embodiment, as shown in FIG. 8, the following requirements are satisfied, in relation to the second gap 15A.

(1) An outer edge 11M on one end side in the seat-width axis of a support rear end 11K projected on the imagined plane SS is located outside (on a right side of, in FIG. 8) an outer edge 15C on one end side in the seat-width axis of a shield front end 15B projected on the imagined plane SS.

(2) The support rear end 11K is located inside (on a left side of, in FIG. 8) the outer edge 11M.

(3) The support rear end 11K side (that is, near the support rear end 11K) of the right tilt arm 11 is a tilted surface smoothly continuing from the outer edge 11M on one end side in the scat-width axis to the support rear end 11K (see also FIG. 5).

The imagined plane SS is a plane parallel to a paper plane of FIG. 8. The support rear end 11K is an end portion of the pad support 11B on the shield 15 side. The shield front end 15B is an end portion of the shield 15 on the pad support 11B.

"The outer edge 11M is located outside the outer edge 15C" means that, in the present embodiment, the outer edge 11M is located on the right side in the seat-width axis with respect to the outer edge 15C, that is, at a position closer to the vehicle entrance/exit. "The support rear end 11K is located inside the outer edge 11M" means that, in the present embodiment, the support rear end 11K is located on the left side in the seat-width axis with respect to the outer edge 11M, that is, at a position farther from the vehicle entrance/exit.

In the present embodiment, as shown in FIG. 8, substantially the entire support rear end 11K projected on the imagined plane SS is located inside the outer edge 15C on one end side in the seat-width axis of the shield front end 15B projected on the imagined plane SS.

"Substantially the entire support rear end 11K is located inside the outer edge 15C" includes, for example, the following three cases in which:

(a) the entire support rear end 11K is located on the left side of the outer edge 15C; (b) a right end of the support rear end 11K overlaps the outer edge 15C; and (c) the right end of the support rear end 11K is located slightly on the right of the outer edge 15C.

"The right end of the support rear end 11K is located slightly on the right side of the outer edge 15C" includes, for example, a case in which a left end of the support rear end 11K is located on the left side of (inside) the outer edge 15C, or the like.

3. Characteristics of Vehicle Seat According to Present Embodiment

The pad support 11B of the right tilt arm 11 has the receiving surface 11C that supports the cushion pad 20 from below, and the receiving surface 11C is a substantially strip-like continuous plane in the support range A. This makes it possible to increase the area of the receiving surface 11C. Thus, the right tilt arm 11 can be inhibited from biting into the cushion pad 20, and a load (pressure upon getting on or off a vehicle) on the buttocks and the legs (especially, the thighs) of the occupant can be decreased.

On both ends of the receiving surface 11C in the seat-width axis, the first flange 11D and the second flange 11E are provided that extend downward from the both ends. The first flange 11D and the second flange 11E are integrally formed with the receiving surface 11C, and continuous within a range in which the receiving surface 11C is provided.

This makes it possible to inhibit an edge portion, such as a cut end surface, from being present at a contact part between the cushion pad 20 and the right tilt arm 11. Further, early damage of the cushion pad 20 can be inhibited.

The outer edge 11L on one end side in the seat-width axis of the support front end 11J projected on the imagined plane S substantially coincides with the outer edge 13C on one end side in the seat-width axis of the panel rear end 13B projected on the imagined plane S.

This makes it possible to inhibit the occupant from experiencing a large sense of discomfort in the first gap 13A, when the occupant slides the buttocks and the legs on the seat cushion 3 to get off the vehicle.

In the present embodiment, the requirements (1) to (3) described above are satisfied. Thus, no sharp portion or a convex portion, such as an edge portion, can be present in the second gap 15A. Early damage of the cushion pad 20 can be inhibited at the support rear end 11K and the shield front end 15B, that is, in the second gap 15A Other Embodiments In the above-described embodiment, the receiving surface 11C, the first flange 11D, and the second flange 11E are integrally formed by press working. However, the present disclosure is not limited thereto.

For example, the receiving surface 11C, the first flange 11D, and the second flange 11E may be integrally formed by die casting or the like, or by welding. In the case of welding, it is desirable that a welded part is polished by a grinder or a buff.

In the first gap 13A according to the above-described embodiment, the outer edge 11L on one end side in the seat-width axis of the support front end 11J projected on the imagined plane SS substantially coincides with the outer edge 13C on one end side in the seat-width axis of the panel rear end 13B projected on the imagined plane SS. However, the present disclosure is not limited thereto.

In the above-described embodiment, the requirements (1) to (3) described above are satisfied. However, the present disclosure is not limited thereto. For example, the right tilt arm 11 and the shield 15 may be flush with each other also in the second gap 15A, similar to the case of the first gap 13A.

The shield 15 is provided in the above-described embodiment. However, the present disclosure is not limited thereto. For example, the shield 15 may not be provided.

In the above-described embodiments, an example of a vehicle seat of a passenger car has been described. However, the present disclosure is not limited thereto. The present disclosure can be also applied to a seat for use in a vehicle such as railway vehicles, ships, and aircrafts, as well as to a stationary type seat for use such as in theatres and at home.

Furthermore, the present disclosure is not limited to the above-described embodiments as long as the present disclosure meets the gist of the invention recited in the claims. Thus, at least two embodiments among the plurality of embodiments described above may be combined.

What is claimed is:

1. A vehicle seat comprising:
    a side frame being arranged on one end in a seat-width direction of the vehicle seat and extending in front-rear direction;
    a tilt arm that has a coupling portion coupled to the side frame and extends from the coupling portion to a seat front side;
    a cushion panel that is coupled to a front end portion of the tilt arm and extends in the seat-width direction, the cushion panel supporting a front end portion of a cushion pad; and
    a pad support that is provided on the tilt arm, the pad support having a receiving surface, a first flange, and a second flange, the receiving surface supporting the cushion pad from below, the first and second flanges extending downward respectively from opposed ends of the receiving surface in the seat-width direction,
    a shield that covers a region of the side frame on a seat rear side of the coupling portion, wherein
        a second gap is provided between the pad support and the shield, an end portion of the pad support on a shield side being a support rear end, an end portion of the shield on a pad support side being a shield front end,
        an outermost edge of the support rear end is located outside an outer edge of the shield front end in the seat-width direction,
        the support rear end is located inside the outermost edge in the seat-width direction, and
        a rear portion of the second flange includes a tilted surface smoothly continuing from the outermost edge to the support rear end,
    wherein the receiving surface is a substantially strip-like surface, and
    wherein the first and second flanges are continuous within a range in which the receiving surface is provided.

2. The vehicle seat according to claim 1, wherein
    a first gap is provided between the pad support and the cushion panel, an end portion of the pad support on a cushion panel side being a support front end, an end portion of the cushion panel on a pad support side being a panel rear end, and
    an outer edge of the support front end substantially coincides with an outer edge of the panel rear end in the seat-width direction.

3. The vehicle seat according to claim 1, wherein the pad support is provided within a support range of the tilt arm extending from the coupling portion to the cushion panel.

4. The vehicle seat according to claim 3, wherein the receiving surface is continuous within the support range.

5. The vehicle seat according to claim 1, wherein the first flange, the second flange, and the receiving surface are integrally formed.

* * * * *